(12) United States Patent  
Weaver

(10) Patent No.: US 6,311,948 B1  
(45) Date of Patent: Nov. 6, 2001

(54) FLUID VALVE ASSEMBLY

(75) Inventor: Mark V. Weaver, Six Mile, SC (US)

(73) Assignee: T&S Brass and Bronze Works, Inc., Travelers Rest, SC (US)

( * ) Notice: Subject to any disclaimer, the term of this patent is extended or adjusted under 35 U.S.C. 154(b) by 0 days.

(21) Appl. No.: 09/535,412

(22) Filed: Mar. 24, 2000

(51) Int. Cl.7 .................................................. F16K 31/12
(52) U.S. Cl. ............................ 251/54; 251/248; 251/254; 137/454.6
(58) Field of Search ................................ 251/48, 52, 54, 251/248, 254, 258, 259; 137/454.6

(56) References Cited

U.S. PATENT DOCUMENTS

| | | | |
|---|---|---|---|
| 4,007,500 | * 2/1977 | Thompson et al. | 251/254 |
| 4,269,390 | * 5/1981 | Bryne | 251/254 |
| 4,804,164 | * 2/1989 | Nakazawa et al. | 251/335.3 |
| 5,451,030 | 9/1995 | Regelbrugge et al. | 251/51 |
| 5,478,045 | * 12/1995 | Ausman et al. | 251/54 |
| 5,655,748 | 8/1997 | Regelbrugge et al. | 251/54 |

* cited by examiner

Primary Examiner—Kevin Shaver  
Assistant Examiner—David A Bonderer  
(74) Attorney, Agent, or Firm—Nelson Mullins Riley & Scarborough, LLP

(57) ABSTRACT

A fluid valve assembly includes a housing, a valve, a rotatable driver received in the housing in operative communication with the valve, and an over-center linkage disposed between the driver and the housing. The housing includes an entrance to permit fluid flow into the housing and an exit to allow fluid flow out of the housing. The valve is disposed between the housing entrance and exit. The valve is configured in an open state to permit fluid flow through the housing and in a closed state to block fluid flow through the housing. Rotation of the driver from a first rotational position toward a second rotational position moves the valve from the closed to the open state, and rotation of the driver from the second rotational position to a third rotational position permits the valve to return to a closed state. The over-center linkage biases the driver to either the first or third rotational position.

37 Claims, 9 Drawing Sheets

FLUID VALVE ASSEMBLY

BACKGROUND OF THE INVENTION

The present invention relates generally to fluid valve assemblies. Fluid valves are commonly used in a variety of applications, including public, residential, and commercial fixtures. Metering valves, for example, have been used where the need exists to control and meter a flow of fluid. Typically, the valve is spring biased to a closed state. An operator must manually actuate the valve, causing it to dispense a metered quantity of fluid before automatically shutting off due to the spring bias.

Self-returning valves are known that drive a valve to an open state through opposing cam surfaces. For instance, one such fixture includes a driver stem rotated by a handle at the stem's upper end. A flange extends radially outward from a bottom end of the drive stem immediately below a ring that is rotationally and axially fixed within the fixture housing. The flange defines a sloped cam surface that rides against a correspondingly sloped cam surface on the ring. As the stem rotates, the ring's cam surface drives the drive stem down against a plunger of a metering valve, thereby opening the valve and permitting water flow. A spring seated between the fixture housing and the driver stem flange pushes the drive stem upward when the operator releases the handle. The flange's cam surface rides back up the ring's cam surface so that the stem and handle rotate to their original position as the stem rises. The now-released metering valve then closes according to its metering operation.

The prior art valve includes a rotational stop within the fixture housing that blocks rotation of the drive stem flange beyond the point at which the stem flange pushes the metering valve to its fully open position.

Two examples of metering valves are disclosed in U.S. Pat. Nos. 5,655,748 and 5,451,030. These patents are commonly assigned to the present assignee, and their entire disclosures are incorporated by reference herein.

OBJECTS AND SUMMARY

The present invention recognizes and addresses disadvantages of prior art construction and methods. Accordingly, it is a principle object of the present invention to provide an improved fluid valve assembly. Additional objects and advantages of the present invention are set forth in part in the description which follows, will be obvious from the description, or may be learned by practice of the invention.

One or more of these objects may be achieved by a fluid valve assembly that includes a housing having an entrance to permit fluid flow into the housing and an exit to allow fluid flow out of the housing. A valve is disposed in the housing between the entrance and exit of the housing. The valve is configured in an open state to permit fluid flow from the housing entrance to the housing exit and in a closed state to block fluid flow from the housing entrance to the housing exit. A rotatable driver is received in the housing and is in operative communication with the valve so that rotation of the driver from a first rotational position toward a second rotational position moves the valve from the closed state to the open state, and rotation of the driver from the second rotational position toward the third rotational position permits the valve to return to the closed state. An over-center linkage disposed between the housing and the driver is configured so that when the driver is between the first and second rotational positions, the over-center linkage biases the driver toward the first rotational position, and when the driver is between the second and third rotational positions, the over-center linkage biases the driver toward the third rotational position.

The accompanying drawings, which are incorporated in and constitute a part of the specification, illustrate one or more embodiments of the invention and, together with the description, serve to explain the principles of the invention.

DETAILED DESCRIPTION OF THE PREFERRED EMBODIMENTS

Reference will now be made in detail to preferred embodiments of the invention, one or more examples of which are illustrated in the accompanying drawings. Each example is provided by way of explanation of the invention, not limitation of the invention. In fact, it will be apparent to those of ordinary skill in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

Figure 1:
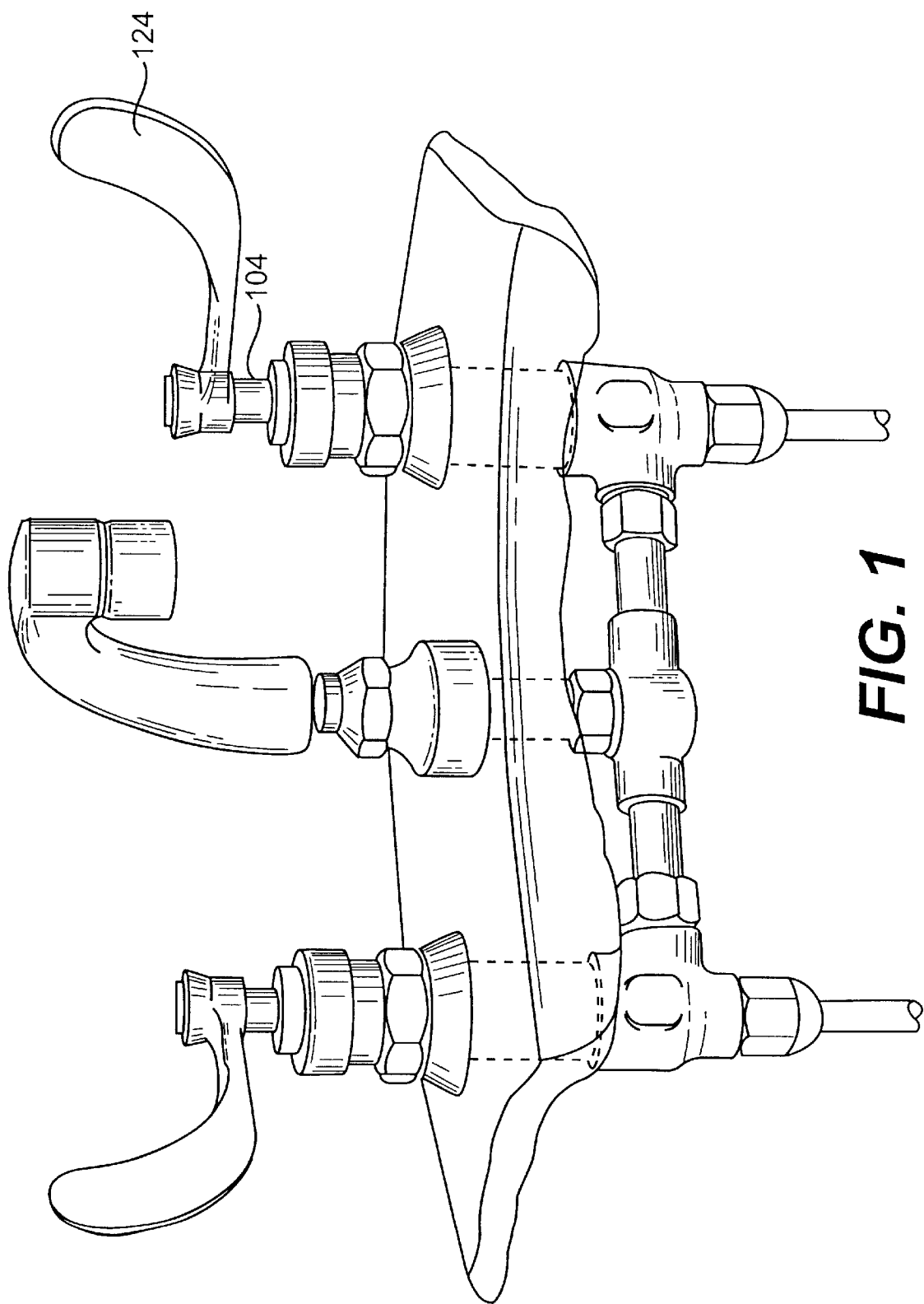
FIG. 1 is a perspective view of a valve assembly according to an embodiment of the present invention.
Figure 2:
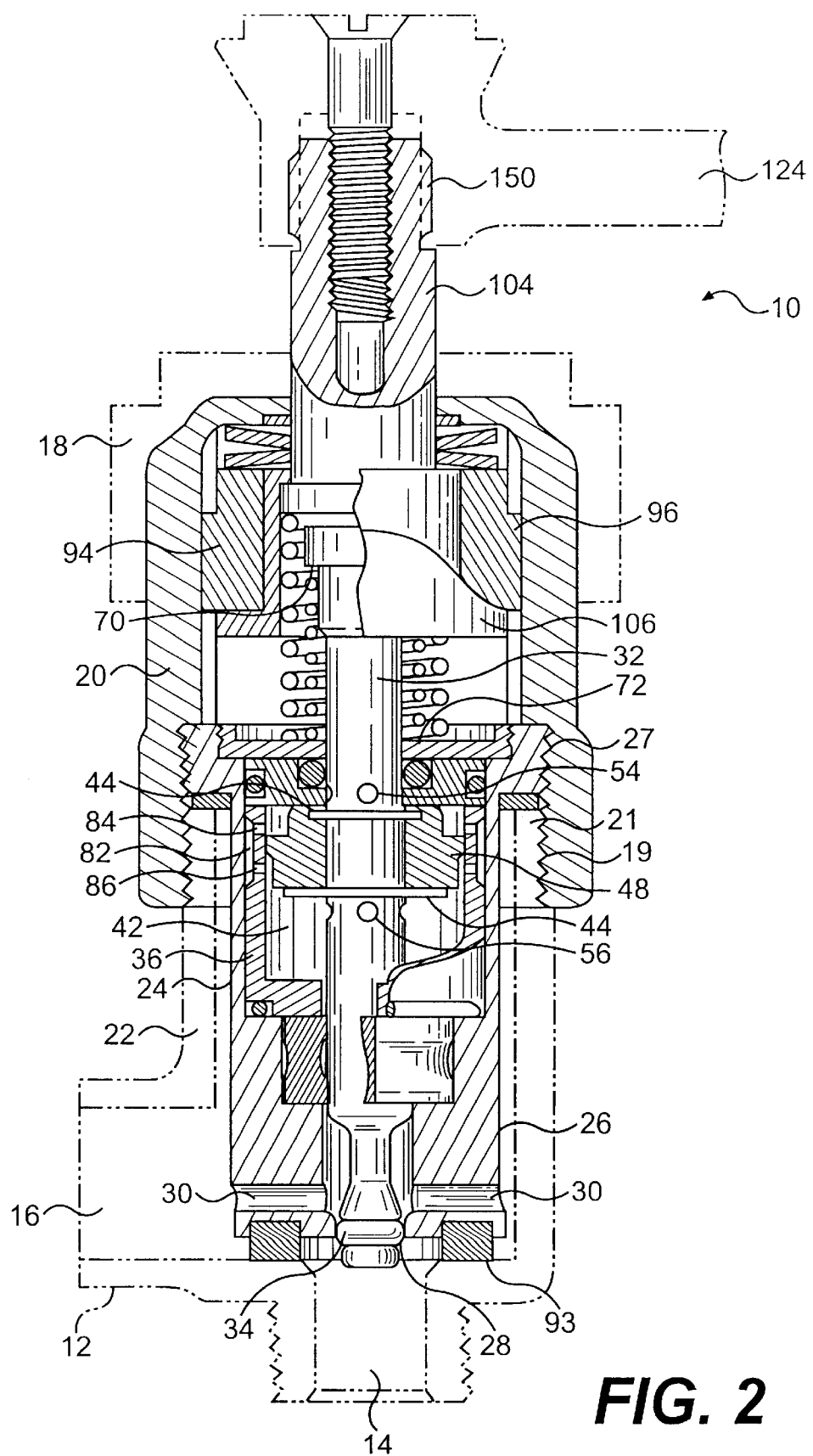
FIG. 2 is a cross sectional component view, partly in section, of a valve assembly according to an embodiment of the present invention.
Figure 3:
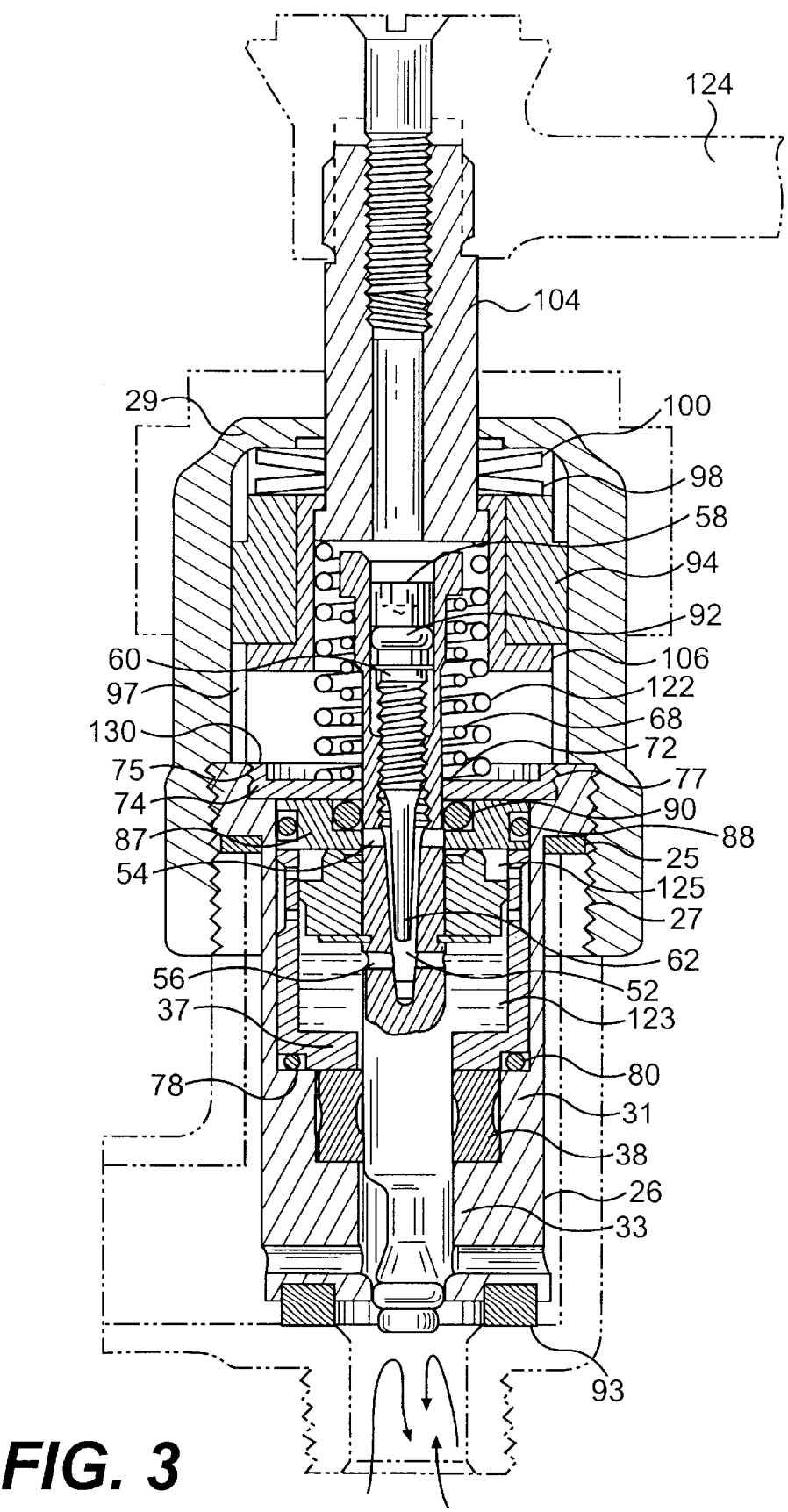
FIG. 3 is a cross sectional component view, partly in section, of a valve assembly according to an embodiment of the present invention.

FIGS. 2 and 3 illustrate an automatically closing fluid valve assembly 10. Valve assembly 10 includes a housing 12 having an entrance 14 and an exit 16 defined on a generally cylindrical lower housing section 22. Housing section 22 is threaded about entrance 14 to receive a fluid source, typically a water line, so that fluid enters housing 12 at entrance 14. Housing 12 further includes a cover 18 and an upper bonnet 20. Upper bonnet 20 is generally cylindrical in shape and defines a radially inwardly extending annular lip 29 through which passes a driver 104. Upper bonnet 20 and lower housing section 22 threadedly engage at 19.

A metering valve 24 is disposed in housing 12. Metering valve 24 includes a valve body 26 that defines an inlet passage 28 and at least one outlet passage 30. Valve body 26 is generally cylindrical in shape and is open on each end with the lower end defining two progressively increasing radially inward projecting flanges, 31 and 33, respectively. Valve body 26 defines threads 27 on its upper outer circumference that mate with the threads on upper bonnet 20 above lower housing section threads 21 and a ring washer 25. Thus, valve body 26 is axially fixed to housing 12. Ring washer 25 is disposed between valve body 26 and lower housing section 22, creating a seal between valve 24 and housing 12.

A moveable valve stem 32 is disposed between inlet passage 28 and outlet passages 30. Valve stem 32 may be of a unitary construction, or may include various parts fastened together to act as one unit. As shown in its closed position in FIG. 2, valve stem 32, together with seal 34, seals inlet passage 28 from outlet passages 30. Seal 34 may be an O-ring or other suitable seal.

Valve 24 further includes a first sleeve 36 received within valve body 26. Sleeve 36 partially defines a pressure chamber 42. An extended quad ring 38 sits beneath first sleeve 36 to seal outlet passages 30 from the pressure chamber. As should be understood by one of ordinary skill in the art, however, first sleeve 36 could extend downwardly into a portion of the space occupied by quad ring 38.

Pressure chamber 42 is defined within an inner diameter surface of sleeve 36, a radially inward extending annular lip portion 37 of sleeve 36, quad ring 38, a lower face of a stem collar 87, and an inner diameter surface of valve body 26. A fluid fills pressure chamber 42 above and below cup seal 48.

Valve stem 32 is moveable through pressure chamber 42. A piston assembly 44 is configured with valve stem 32 so as to be longitudinally moveable therewith. Piston assembly 44 may be formed integrally with valve stem 32 or, for ease of manufacture and assembly, may comprise separate components that are press fit or otherwise fixed to valve stem 32. Piston assembly 44 includes a cup seal 48 that forms a seal between the piston assembly and the inner circumference of sleeve 36. This seal allows fluid flow around the seal when pressure below the seal is greater than the pressure above, for example as occurs as the valve is actuated. Conversely, the seal prevents fluid flow in the reverse direction, even when pressure above the seal exceeds the pressure below. Thus, under such conditions, fluid is forced through a metering mechanism as discussed below. A cup seal is preferred as it minimizes or precludes altogether the need for a separate pilot valve to equalize pressure in the chamber above the piston.

Referring now to FIG. 3, a metering passage 52 is defined as an axial bore through valve stem 32 and includes at least one high port 54 disposed above piston assembly 44 and at least one lower port 56 disposed below piston assembly 44. An adjusting device 58 is provided to variably adjust the size of metering passage 52 and thereby control the rate of fluid flow through the passage. Preferably, adjusting device 58 includes a metering screw 60 that is disposed at the top of valve stem 32 and that has a needle portion 62 extending into metering passage 52. Metering screw 60 is threadedly engaged with an inner circumference of valve stem 32 and is adjustable thereby. It should be understood, however, that means for regulating metering fluid flow other than metering screws are known and may be used in conjunction with the present invention.

Referring also to FIG. 2, valve stem 32 acts as a plunger. It is biased to the closed state of the valve through a spring 68 disposed between a seat 70 defined on an axially downward facing ledge on valve stem 32 and a seat 72 defined on an axially upward facing surface of bonnet cap 74. Valve bonnet cap 74 defines threads 75 on its outer circumference that mate with threads 77 on an upper inner circumference of valve body 26. As illustrated in the figures, valve stem 32 is disposed through bonnet cap 74.

Metering valve 24 may also include a second sleeve. In the embodiment illustrated in the figures, the valve body acts as a second sleeve. In this configuration, first sleeve 36 rests against a seat 78 defined by the axially upward facing surface of flange 31 on valve body 26. An O-ring 80 is disposed on seat 78 between first sleeve 36 and valve body 26.

As illustrated in FIG. 2, fluid can travel between first sleeve 36 and valve body 26 through a vent passage 82. In or near the metering valve's closed state, the vent passage is defined from a location above piston assembly 44 to a location below piston assembly 44 through holes 84 and 86 that extend completely through first sleeve 36 to a gap between the first sleeve and the valve body.

Metering valve 24 also includes a number of other sealing devices. For example, an O-ring 88 is disposed between a radially outward facing cavity on stem collar 87 and an inner diameter surface of valve body 26. An O-ring 90 is provided between valve stem 32, the bottom surface of bonnet cap 74, and stem collar 87 to seal pressure chamber 42. These sealing devices insure that the fluid path between first sleeve 36 and valve body 26 is defined only between O-rings 88 and 80.

Referring to FIGS. 2 and 3, an O-ring 92 is provided between metering screw 60 and an inner circumferential surface of valve stem 32 to insure that pressure chamber fluid does not leak from the metering passage 52 defined through valve stem 32. Sealing device 93, illustrated as a washer seal, is disposed between a downwardly facing axial surface of valve body 26 and an axially upward facing surface of lower housing section 22 to prevent fluid flow between housing entrance 14 and exit 16.

It should thus be recognized that a fluid-tight chamber that includes chamber 42 is generally defined within the bounds of the above-described seals. Because this metering chamber is segregated from fluid flow through inlet passage 28 and outlet passages 30, a fluid may be chosen to operate therein to optimize effective metering valve operation. For example, the use of air or, particularly, an inert gas such as argon reduces corrosion of valve components such as metering screw 62 from that encountered when, for example, water is tapped into a metering chamber from the main valve fluid flow. Furthermore, the fluid-tight metering chamber 42 enables the use of a substantially constant fluid volume free of the debris typically found in water flow. Debris within the pressure chamber may clog metering passages 52 and/or 82, or ports 54 and 56, or holes 84 and 86. It should be understood that various fluids or fluid mixtures may be employed for use within the pressure chamber.

Figure 7:
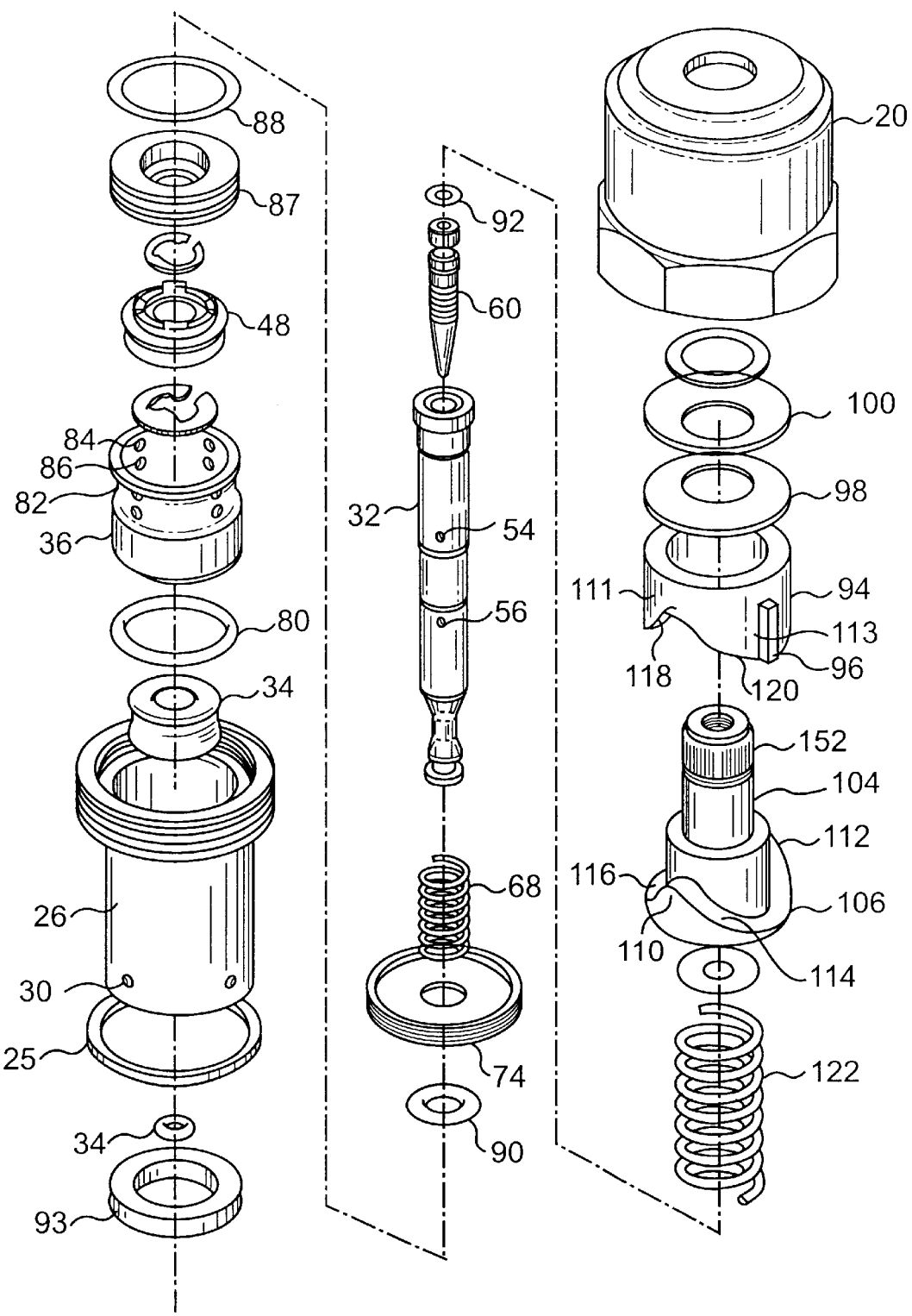
FIG. 7 is a partial exploded view of a valve assembly in accordance with an embodiment of the present invention.

Referring also to FIG. 7, an annular ring 94 of a structural polymer material, such as Delrin, is disposed within housing 12 in upper bonnet 20. Annular ring 94 defines at pair of axial splines 96 on its outer circumference that are received in a corresponding pair of grooves 97 in housing upper bonnet 20 so that the annular ring is rotationally held to, but axially movable with respect to, housing 12. A pair of oppositely oriented belleville disc springs 98 and 100 sits between annular ring 94 and annular lip 29 on housing upper bonnet 20. The belleville springs have a much greater compressive strength than does a spring 122, which biases driver 104 to its upward position. In the illustrated embodiment, for example, two belleville springs may exert an axial force of approximately 50–350 pounds, depending on the springs used. It should be understood that other forms of spring, for example a coil spring or rubber pad, may be used in place of the belleville springs.

Driver 104 is axially and rotationally fixed to a ring 106. A driver handle 124 is rotationally fixed to driver 104 through corresponding splines at 150. Thus, rotation of driver handle 124 rotates driver annular ring 106 with respect to ring 94. Ring 106 may be made of a polymer or a metallic material, such as brass. Driver 104 and annular ring 106 may be of separate or unitary construction.

As shown in FIGS. 2 and 7, driver annular ring 106 and annular ring 94 define mating ramp surfaces that form an over-center linkage. Annular ring 106 defines two sets of generally sawtooth shaped ramps 110 and 112, each set defining side ramp surfaces 114 and 116. Annular ring 94 defines a mating ramp surface 118 on one side of ramp set 111 and a mating ramp surface 120 on one side ramp set 113 so that when driver 104 is in a first rotational position, as shown in FIGS. 2, 3, 6, and 8A, ramp surface 116 on driver 104 mates with ramp surface 118 on annular ring 94, and ramp surface 114 on driver 104 mates with ramp surface 120 on annular ring 94. Ramp set 112 on the other side of driver annular ring 106 similarly mates with corresponding ramp surfaces on annular ring 94 (not shown in FIG. 7) when the driver is in the first rotational position. As shown in FIG. 2, valve 24 is in the closed state when the driver is in the first rotational position.

Figure 4:
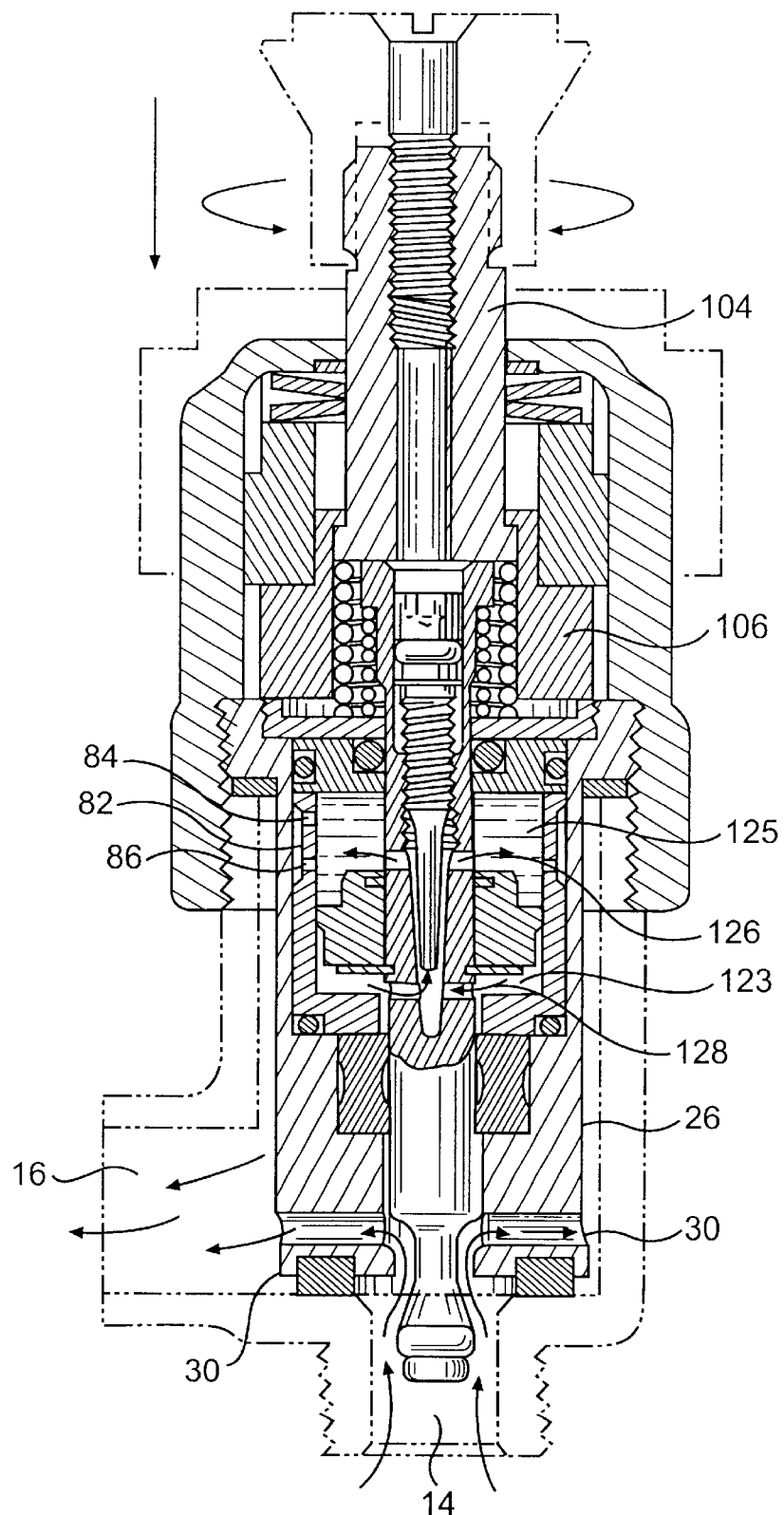
FIG. 4 is a cross sectional component view, partly in section, of a valve assembly according to an embodiment of the present invention.
Figure 8A:
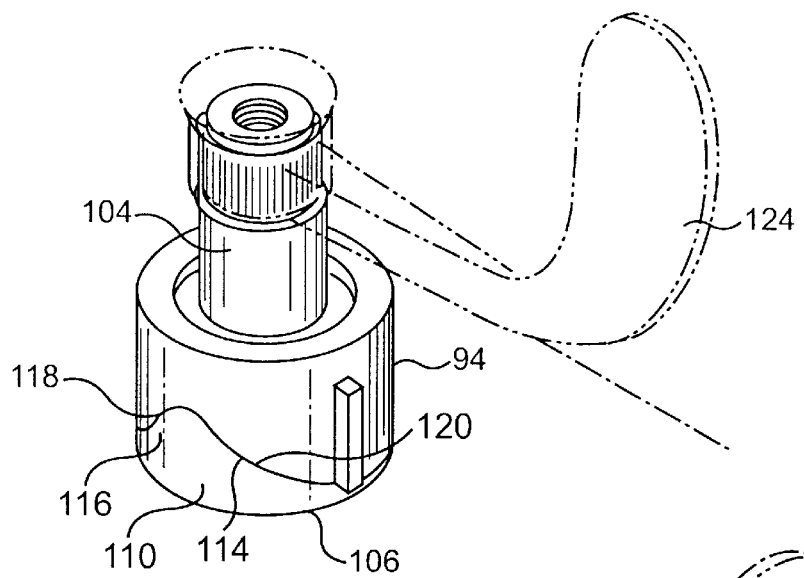
FIG. 8A is a perspective view of a driver and over-center linkage for use in a valve assembly according to an embodiment of the present invention.
Figure 8B:
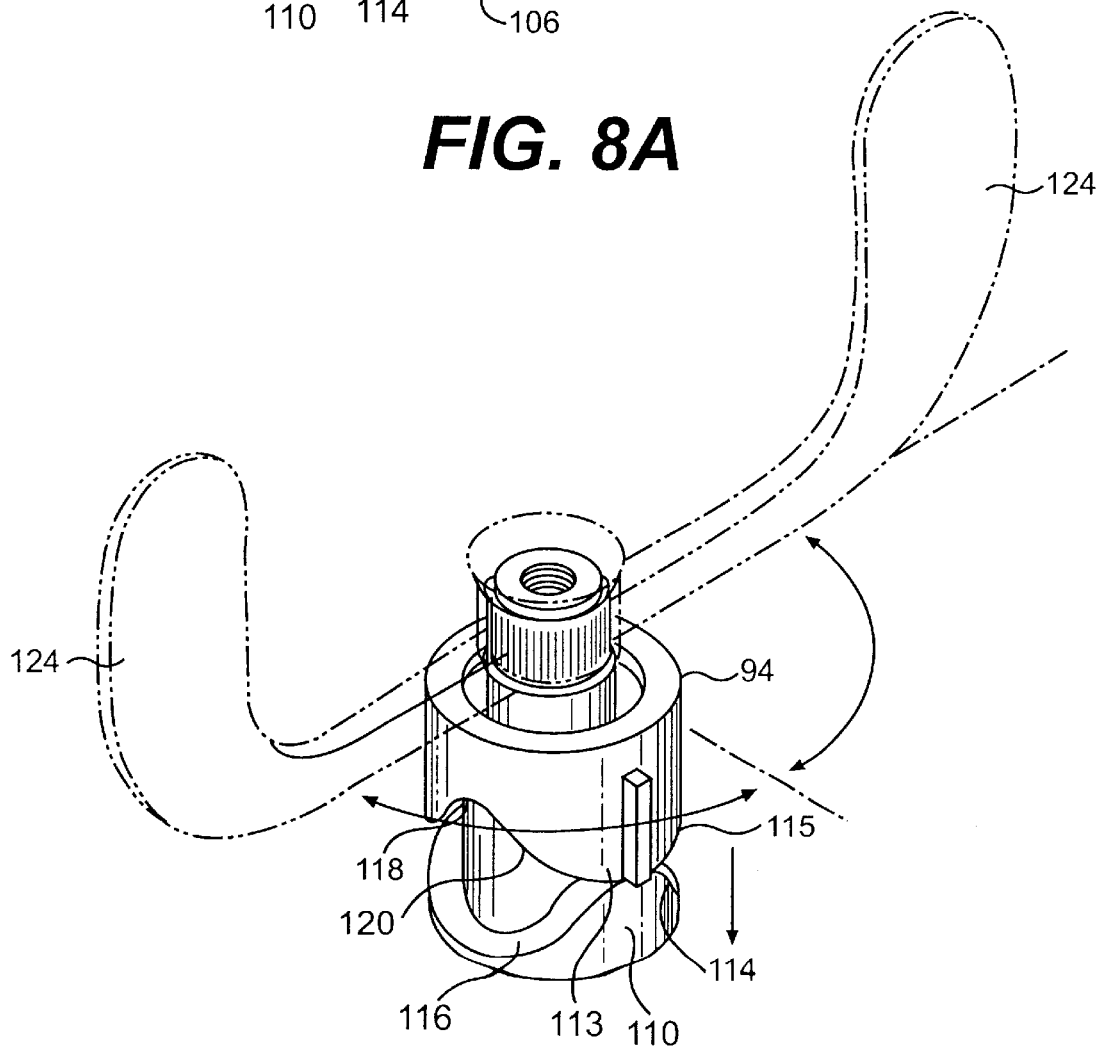
FIG. 8B is a perspective view of a driver and over-center linkage for use in a valve assembly according to an embodiment of the present invention.
Figure 8C:
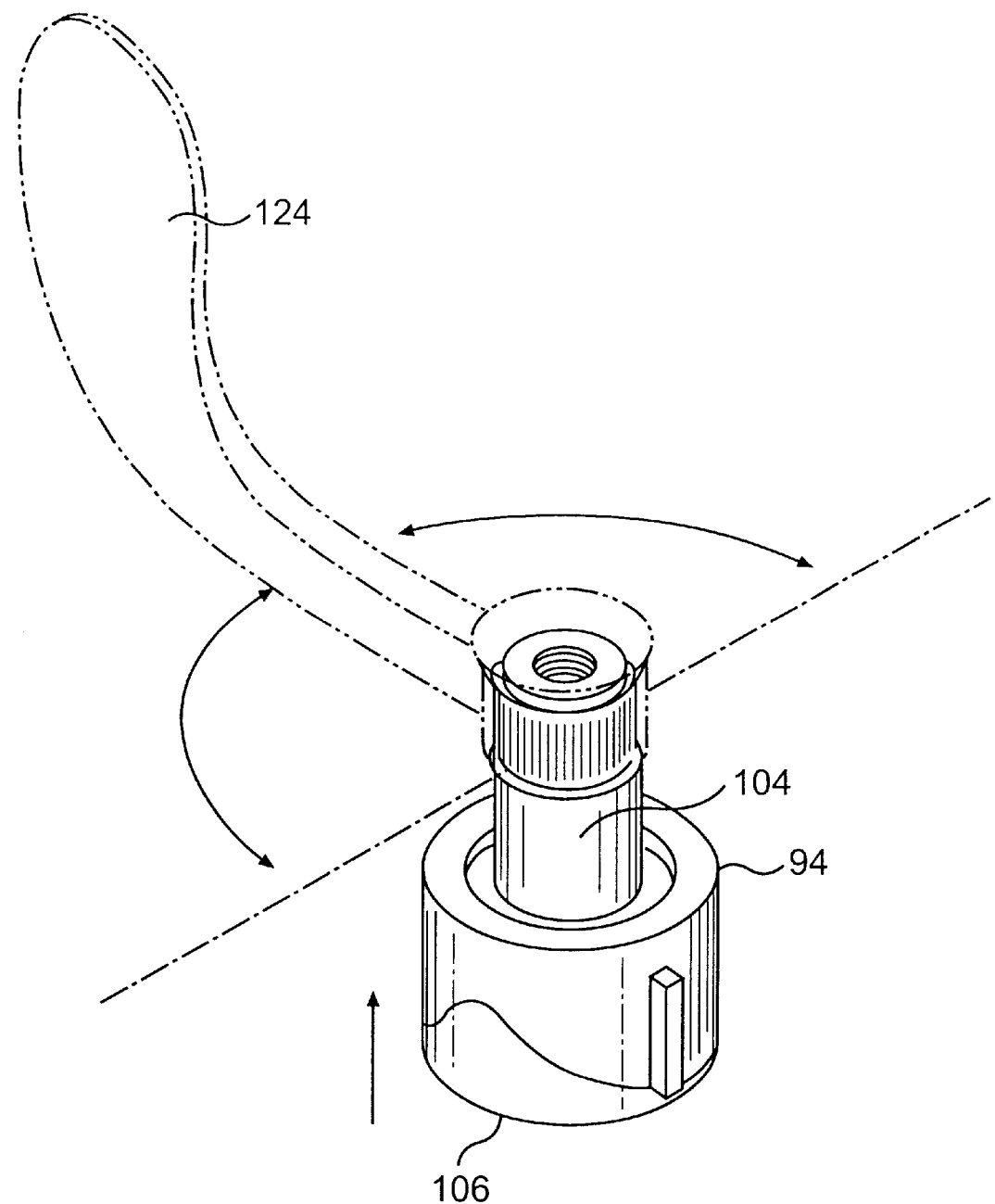
FIG. 8C is a perspective view of a driver and over-center linkage for use in a valve assembly according to an embodiment of the present invention.

As shown in FIGS. 8A, 8B, and 8C, driver 104 can rotate 360 degrees with respect to annular ring 94, which is rotationally held to the housing 12. FIG. 8A shows the driver in the first rotational position, wherein the ramps on driver annular ring 106 and annular ring 94 are matingly engaged. As shown in FIG. 8B, however, rotation of driver 104 via driver handle 124 drives ramps 110 down the slopes 118 or 120, depending on the direction the handle is turned. This rotation moves driver 104 axially downward toward valve stem 32 against the force of spring 122 (FIG. 2). Upon further rotation of handle 124, driver 104 pushes valve stem 32 axially downward against the force of spring 68. This, in turn, moves the lower end of valve stem 32 out of inlet passage 28 to allow fluid flow into the inlet passage and out of outlet passages 30, as shown in FIG. 4.

As the valve stem moves downward to open the valve, piston assembly 44 moves downward through the metering chamber. The metering fluid in the space 123 below piston assembly 44 is forced upwards and around cup seal 48 into the space 125 above the piston assembly, as shown in FIG. 4. As indicated at arrows 126 and 128, some pressure chamber fluid passes from space 123 to space 125 through metering passage 52 via lower ports 56 and high ports 54. Furthermore, a small amount of fluid also passes through vent passage 82 via holes 86 and 84.

An upper surface of valve bonnet cap 74 forms a stop 130 that limits downward axial movement of driver 104. Alternatively, stop 130 may be formed by an upper surface of valve body 26. In the illustrated embodiment, driver 104 engages stop 130 before the driver can rotate 90 degrees from the first rotational position as shown in FIG. 8A to a second rotational position as shown in FIG. 8B. The driver engages stop 130 after rotating approximately 75 degrees from the first rotational position. It should be understood that the point at which the driver engages the stop may vary from 75 degrees.

As noted above, belleville springs 98 and 100 require a much greater compressive force than do springs 122 and 68, combined. Accordingly, prior to the point at which driver 104 engages stop 130, rotation of driver handle 124 compresses springs 122 and 68 rather than the belleville springs. Once driver 104 engages stop 130 and can no longer move axially downwards, however, continued rotation of driver handle 124 drives annular ring 94 axially upward on driver ramp sets 110 and 112 against the force of springs 98 and 100. At this point, the operator has achieved the desired result of opening the valve. This result, coupled with the increasing force required to further rotate handle 124, should discourage the operator from fully rotating driver 104 to the second rotational position. Thus, the operator will generally release handle 124, which then returns to its original position under the force of spring 122.

If, however, the operator forces handle 124 against the resistance of springs 98 and 100 so that the driver passes the second rotational position as shown in FIG. 8B, springs 98 and 100 push ring 94 down against the back slopes of the sawtooth shaped ramp surfaces of ring 106. Continued rotation, or release, of handle 124 then permits spring 122 to push ring 106 further down the slopes of the cam surfaces of ring 94, thereby biasing the driver to a third rotational position where the cam surfaces again mate, as shown in FIG. 8C. For example, referring to FIG. 8B, ramp surface 116 mates with ramp surface 115 in the third rotational position. The third position, like the first, permits the metering valve to close. Thus, the over-center linkage formed by the opposing sawtooth shaped ramp surfaces of rings 94 and 106 permits the valve assembly to continue its normal operation even where the handle is forced beyond its normal operational range.

From the third rotational position shown in FIG. 8C, an operator may return the driver to the first rotational position by forcing the driver through the second rotational position in either rotational direction. That is, the driver may be rotated a full 360 degrees without hindering the valve assembly's operation. It should be appreciated that the second rotational position can be reached by rotating handle 124 in either direction away from the first or third positions, which in the embodiment illustrated in the drawings are approximately 180 degrees apart.

Figure 6:
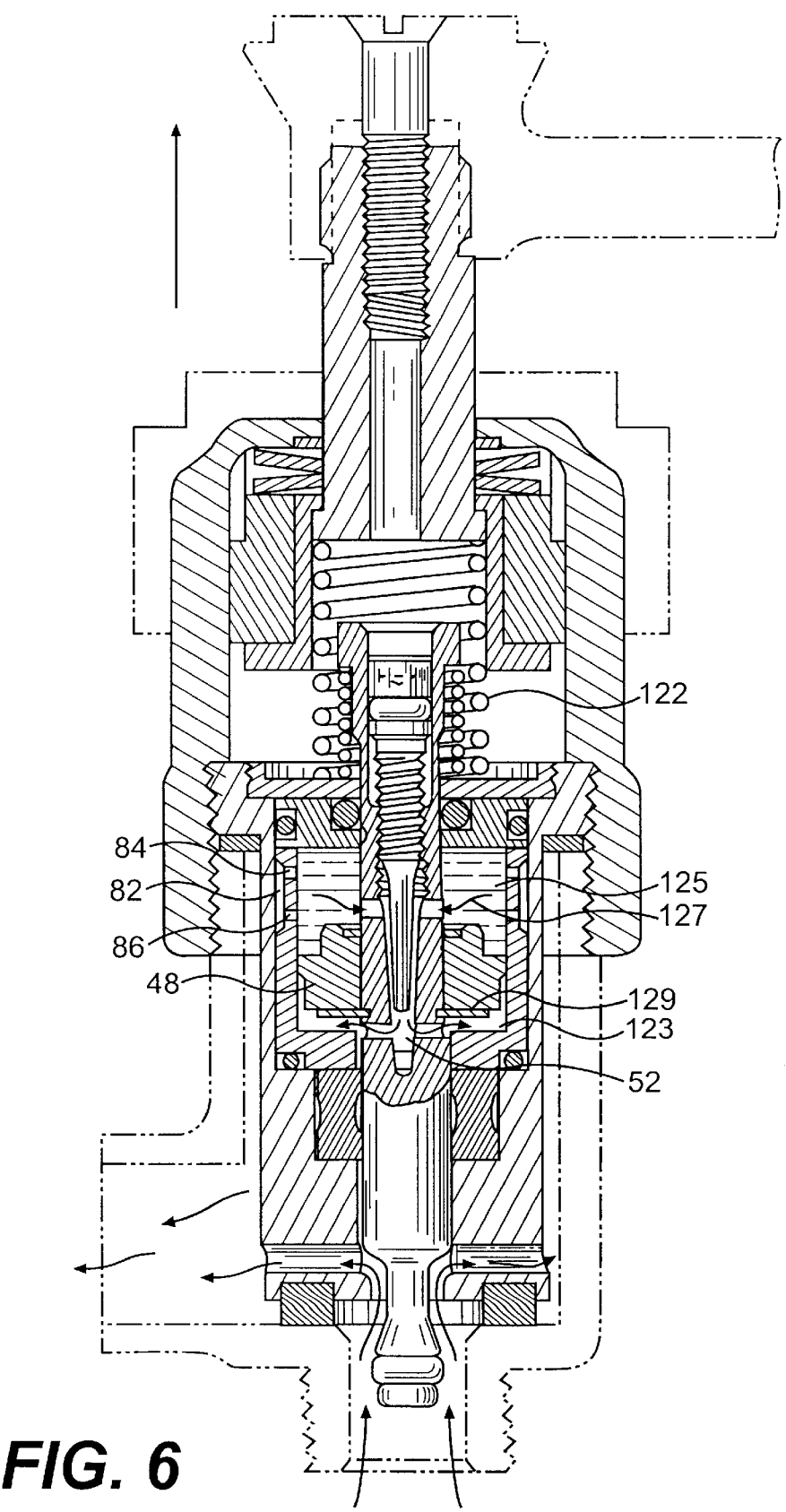
FIG. 6 is a cross sectional component view, partly in section, of a valve assembly according to an embodiment of the present invention.

If an operator does not force handle 124 beyond the second position, but instead releases the handle, spring 122 biases driver 104 upwards as shown in FIG. 6. Driver 104's upward movement causes the ramps on driver 104 and annular ring 94 to again mate as shown in FIG. 8A. In this position, or in the third position as shown in FIG. 8C, spring 68 pushes valve stem 32 axially upward, thereby closing the valve.

Driver ring 106 and ring 94 may be provided with more than two sets of opposing ramp surfaces so that the rings define multiple third positions. For example, where the rings define three sets of evenly spaced apart ramp sets, as opposed to two sets as shown in the figures, there are three rotational positions in which the ramps matingly engage. Starting at any one of these positions, which may be considered the first position as described herein, an operator may rotate the handle 120° through a second position to the next third position. This position may then be considered a "first" position with respect to the next "third" position 120° further away. Thus, the operator may rotate the handle 360° through three positions in which the ramp surfaces mate and the valve is allowed to close and through three positions in which the valve is forced open. Accordingly, it should be understood that an adjacent pair of first and third positions may be separated by various angles as desired, for example 360° divided by a whole number greater than two.

Figure 5:
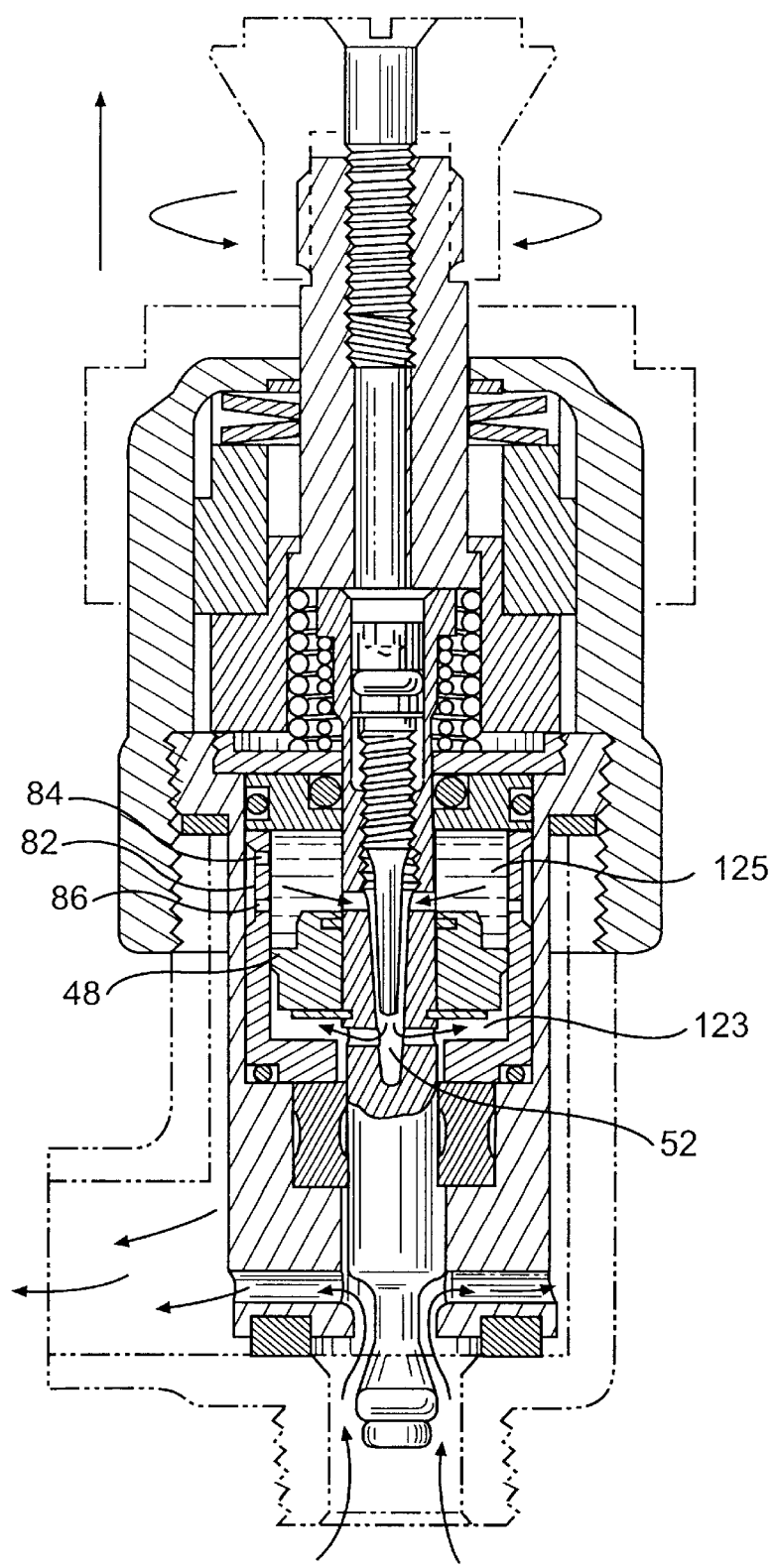
FIG. 5 is a cross sectional component view, partly in section, of a valve assembly according to an embodiment of the present invention.

The rate of travel of piston assembly 44 is limited by the manner in which the fluid above piston assembly 44 is metered through metering passage 52 to the area below the piston assembly, as shown by arrows 127 and 129 in FIG. 6. The fluid above piston assembly 44 generally does not pass around the flanges of the cup seal. As shown in FIG. 4, when valve 24 moves from the open state to the closed state, cup seal 48 seals higher pressure fluid in the space 125 above the piston. Referring particularly to FIGS. 5 and 6, when driver 104 is released, and when spring 68 therefore drives valve stem 32 and piston assembly 44 upwards, fluid from area 125 initially passes through metering passage 52, through high ports 54 and low ports 56, to area 123 below the piston assembly. Once the outer flange of cup seal 48 moves above lower holes 86, however, vent passage 82 becomes operable, and some fluid moves from area 125 through holes 84, into vent passage 82 and out of holes 86 into area 123. As long as the flanges of cup seal 48 are below the bottom hole 86, vent passage 82 is not operable. For example, since bottom holes 86 are above the cup seal, there exists only the metering passage 52 for purposes of pressure chamber fluid travel from area 125 to area 123. Vent passage 82 is not yet defined, and any fluid forced out of holes 84 will simply be directed back through holes 86 to the space above the piston assembly.

Thus, when valve stem 32 and piston assembly 44 move from the open state of the valve, as shown in FIG. 4, to the closed state of the valve, as shown in FIGS. 2 and 3, the primary factor in determining the length of time that the valve remains in the open state is the adjustment to metering screw 60, which determines the size of metering passage 52. For example, if metering screw 60 is turned so as to further restrict metering passage 52, the amount of chamber fluid which can pass from above piston assembly 44 to below the piston assembly is further restricted. This extends the time needed to return piston assembly 44 to its closed state, thus extending the time that valve 24 remains in the open state.

As should be understood by those of ordinary skill in the art, compression of a metering fluid in the pressure chamber, including air and other gases, above piston assembly 44 causes the metering fluid to exert an opposing force on piston assembly 44 in a spring-like manner, causing a noisy "chattering" effect. Chattering may occur when piston assembly 44 moves toward the closed position, decreasing the volume of and increasing the pressure within the portion of chamber 42 above the piston assembly. Vent passage 82 defines a vent for chamber fluid entrapped above piston assembly 44 and, thus, eliminates chattering of the metering valve and insures complete closure of the valve.

Once vent passage 82 is established, the additional fluid path from above piston assembly 44 to below the piston assembly allows the piston assembly to move at a quicker rate, thereby causing the valve to close at a quicker rate. Thus, preferably, vent passage 82 is not defined until just before the valve returns to its closed state. Accordingly, second holes 86 are at a longitudinal distance from first holes 84 so that the vent passage is not established until piston assembly 44 has traveled at least one-half the distance from the open state to the closed state.

While one or more preferred embodiments of the present invention have been described above, it should be understood that any and all equivalent realizations of the present invention are included within the scope and spirit thereof. For example, while the embodiment illustrated in the figures works in conjunction with an isolated pressure chamber fluid-tight metering valve, it should be understood that the valve assembly may include any suitable construction. Thus the depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A fluid valve assembly, said valve assembly comprising:
   a housing including an entrance to permit fluid flow into said housing and an exit to allow fluid flow out of said housing;
   a valve disposed in said housing between said entrance and said exit, said valve being configured in an open state to permit fluid flow from said entrance to said exit and in a closed state to block fluid flow from said entrance to said exit;
   a rotatable driver received by said housing in operative communication with said valve so that rotation of said driver from a first rotational position toward a second rotational position moves said valve from said closed state to said open state and so that rotation of said driver from said second rotational position toward a third rotational position permits said valve to return to said closed state; wherein said second rotational position is between said first rotational position and said third rotational position; and
   an over-center linkage between said housing and said driver, said linkage configured so that when said driver is between said first rotational position and said second rotational position, said linkage biases said driver toward said first rotational position, and when said driver is between said second rotational position and said third rotational position, said linkage biases said driver towards said third rotational position.

2. The fluid valve assembly as in claim 1, wherein said first rotational position and said third rotational position are separated by an angle equal to 360° divided by a whole number greater than two.

3. The fluid valve as in claim 2, wherein said first rotational position and said third rotational position are 180° apart.

4. The fluid valve assembly as in claim 1, wherein said driver is an elongated stem axially received in said housing.

5. The fluid valve assembly as in claim 1, wherein said over-center linkage includes a plurality of first generally saw-tooth shaped ramps rotationally fixed to said driver and a plurality of second generally saw-tooth shaped ramps rotationally fixed to said housing, wherein said first ramps matingly receive said second ramps when said driver is in said first rotational position and when said driver is in said third rotational position.

6. The fluid valve assembly as in claim 5, including two sets of said first ramps and two sets of said second ramps.

7. The fluid valve assembly as in claim 5, wherein said driver includes an elongated driver stem, wherein said first ramps are axially fixed to said driver stem and axially reciprocal with respect to said housing, and wherein said second ramps are received within an internal cavity of said housing so that said second ramps are rotationally held to said housing.

8. The fluid valve assembly as in claim 7, including a first spring received by said housing in communication with said driver stem so that said first spring biases said first ramps to matingly receive said second ramps when said driver is in said first rotational position and in said third rotational position, wherein rotation of said driver stem from one of said first rotational position and said third rotational position toward said second rotational position moves said first ramps up said second ramps and moves said driver downward against said first spring.

9. The fluid valve assembly as in claim 8, including
a stop axially fixed with respect to said housing so that said driver stem engages said stop during said rotation before said stem reaches said second rotational position; and
a second spring operatively disposed between said housing and said second ramps;
wherein said second ramps are axially reciprocally disposed between said first ramps and said second spring so that continued said rotation of said driver following engagement of said stop by said stem moves said second ramps axially away from said first ramps against said second spring, and
wherein said second spring has a greater compression force than said first spring.

10. The fluid valve assembly as in claim 9, including an annular ring disposed in said housing and defining said second ramps on a transverse face thereof.

11. The fluid valve assembly as in claim 10, wherein an interior surface of said housing defines a plurality of axially aligned cavities that receive a plurality of splines on said ring to rotationally fix said ring to said housing and to permit axial movement of said ring with respect to said housing.

12. The fluid valve assembly as in claim 9, wherein said second spring includes at least one belleville spring.

13. The fluid valve assembly as in claim 9, wherein compression of said second spring so that said driver can rotate to said second rotational position requires application of an axial force between said ring and said second spring of between 50–350 pounds.

14. The fluid valve assembly as in claim 8, wherein said first spring is a coil spring.

15. The fluid valve assembly as in claim 14, wherein said third spring is a coil spring.

16. The fluid valve assembly as in claim 7, wherein said stem includes a shaft section and a flange section extending radially from said shaft section, said flange section defining said first ramps.

17. The fluid valve assembly as in claim 16, wherein said flange section is non-integral with said shaft section and is pressed onto said shaft section.

18. The fluid valve assembly as in claim 1, wherein said valve is a metering valve.

19. The fluid valve assembly as in claim 1, wherein said valve includes
a valve body having an inlet passage and an outlet passage defined therein,
a movable valve stem disposed between said inlet passage and said outlet passage so as to seal said inlet passage from said outlet passage in said closed state of said valve and to define a fluid path from said inlet passage to said outlet passage in said open state of said valve, said valve stem being biased to said closed state,
a sleeve configured with said valve body and having an inner diameter surface at least partially defining a pressure chamber within a fluid-tight metering chamber sealing a fluid medium in said metering chamber from said fluid path, said valve stem being movable through said pressure chamber,
a piston assembly disposed within said pressure chamber and configured with said valve stem to move therewith, said piston assembly being movable to said open state upon actuation of said valve stem and automatically movable from said open state to said closed state upon release of said valve stem, said piston assembly including a sealing device configured to sealingly engage with said inner diameter surface of said sleeve during movement of said piston assembly to said closed state, and
a metering passage defined through said valve stem between a location above said sealing device to a location below said sealing device, the rate of return of said piston assembly from said open state to said closed state being dependent upon the time required for said fluid medium in said pressure chamber above said sealing device to be metered through said metering passage to below said sealing device.

20. The fluid valve assembly as in claim 19, including a third spring disposed within said housing so that said third spring biases said valve stem toward said closed state of said valve.

21. The fluid valve assembly as in claim 20, wherein said valve assembly is configured so that the time required for said valve to return to said closed state is greater than the time required for said driver to return to one of said first rotational position and said third rotational position.

22. A fluid valve assembly, said valve assembly comprising:
a housing including an entrance to permit fluid flow into said housing and an exit to allow fluid flow out of said housing;
a valve disposed in said housing between said entrance and said exit, said valve being configured in an open state to permit fluid flow from said entrance to said exit and in a closed state to block fluid flow from said entrance to said exit;
an elongated rotatable driver disposed in said housing, wherein said driver defines a plurality of first generally saw-tooth shaped ramps on a transverse face thereof, said first ramps being rotationally and axially fixed to said driver, wherein said driver is in communication with said valve so that rotation of said driver from a first rotational position toward a second rotational position moves said valve from said closed state to said open state, and wherein rotation of said driver from said second rotational position toward a third rotational position permits said valve to return to said closed state;
a first spring operatively disposed between said driver and said housing; and
an annular ring rotationally held to and axially movable with respect to said housing, wherein said ring defines a plurality of second generally saw-tooth shaped ramps on a transverse face thereof that engage said first ramps on said driver so that when said driver is between said first rotational position and said second rotational position, said first ramps and said second ramps and said first spring bias said driver toward said first rotational position and when said driver is between said second rotational position and said third rotational position, said first ramps and said second ramps and said first spring bias said driver toward said third rotational position, and wherein said first ramps and said second ramps matingly engage in said first rotational position and in said third rotational position.

23. The fluid valve assembly as in claim 22, wherein said first rotational position and said third rotational position are 180 degrees apart.

24. The fluid valve assembly as in claim 22, wherein said valve is a metering valve.

25. The fluid valve assembly as in claim 24, wherein said metering valve includes
- a valve body having an inlet passage and an outlet passage defined therein,
- a movable valve stem disposed between said inlet passage and said outlet passage so as to seal said inlet passage from said outlet passage in said closed state of said valve and to define a fluid path from said inlet passage to said outlet passage in said open state of said valve, said valve stem being biased to said closed state,
- a sleeve configured with said valve body and having an inner diameter surface at least partially defining a pressure chamber within a fluid-tight metering chamber sealing a fluid medium in said metering chamber from said fluid path, said valve stem being movable through said pressure chamber,
- a piston assembly disposed within said pressure chamber and configured with said valve stem to move therewith, said piston assembly being movable to said open state upon actuation of said valve stem and automatically movable from said open state to said closed state upon release of said valve stem, said piston assembly including a sealing device configured to sealingly engage with said inner diameter surface of said sleeve during movement of said piston assembly to said closed state, and
- a metering passage defined through said valve stem between a location above said sealing device to a location below said sealing device, the rate of return of said piston assembly from said open state to said closed state being dependent upon the time required for said fluid medium in said pressure chamber above said sealing device to be metered through said metering passage to below said sealing device.

26. The fluid valve assembly as in claim 25, including a third spring operatively disposed between said valve and said valve stem so that said third spring biases said valve stem away from said valve permitting said valve to return to said closed state.

27. The fluid valve assembly as in claim 26, wherein said third spring is a coil spring.

28. The fluid valve assembly as in claim 22, including two sets of said first ramps and two sets of said second ramps.

29. The fluid valve assembly as in claim 22, wherein rotation of said driver moves said first ramps against said second ramps so that said driver compresses said first spring and moves said driver axially away from said second ramps to engage said valve.

30. The fluid valve assembly as in claim 22, wherein said housing defines a stop disposed so that said stop blocks further downward axial movement of said driver and said driver engages said stop before said driver reaches said second rotational position.

31. The fluid valve assembly as in claim 30, including a second spring operatively disposed between said ring and said housing so that said second spring biases said second ramps against said first ramps.

32. The fluid valve assembly as in claim 31, wherein said second spring has a greater compressive force than said first spring.

33. The fluid valve assembly as in claim 31, wherein the force required to compress said second spring to enable said driver to rotate to said second rotational position is greater than 200 pounds.

34. The fluid valve assembly as in claim 31, wherein said second spring is at least one belleville spring.

35. The fluid valve assembly as in claim 22, wherein an interior surface of said housing defines a plurality of axially aligned cavities that receive a plurality of splines on said ring to rotationally fix said ring to said housing and to permit axial movement of said ring with respect to said housing.

36. The fluid valve assembly as in claim 22, wherein said first spring includes a coil spring.

37. A fluid valve assembly, said valve assembly comprising:
- a housing including a generally cylindrical lower section threadedly engaged to a generally cylindrical upper bonnet, said housing lower section including an entrance to permit fluid flow into said housing and an exit to allow fluid flow out of said housing;
- a metering valve disposed in said housing between said entrance and said exit, said metering valve being configured in an open state to permit fluid flow from said entrance to said exit and in a closed state to block fluid flow from said entrance to said exit;
- an elongated rotatable driver disposed through said upper bonnet, said driver defining a handle at its upper end for rotation of said driver and two sets of generally saw-tooth shaped first ramps on an axially upward facing transverse face of an annular collar extending radially outward from a lower end of said driver;
- an annular ring disposed between said housing and said driver, wherein said ring is rotationally held to, but is axially moveable with respect to, said housing and defines two sets of generally saw-tooth shaped second ramps on an axially downward facing transverse face and wherein said annular ring receives said annular collar so that said first ramps receive said second ramps;
- a first spring disposed between said driver and said housing so that said first spring biases said driver annular collar toward said annular ring;
- a second spring disposed between said annular ring and said upper housing bonnet so that said second spring biases said annular ring toward said driver annular collar, wherein the compressive force of said second spring is greater than the compressive force of said first spring so that rotation of said driver from a first rotational position, in which said first ramps matingly engage said second ramps, toward a second rotational position, in which peaks of said first ramps oppose peaks of said second ramps, drives said driver annular collar and said driver axially downward on said second ramps against said first spring to engage said metering valve and drive said metering valve from said closed state to said open state; and
- a stop disposed within said housing so that said driver engages said stop prior to said driver reaching said second rotational position, so that, following engagement of said stop by said driver, further rotation of said driver to said second rotational position drives said annular ring axially upward on said first ramps against said second spring, and so that rotation of said driver beyond said second position moves said first ramps and said second ramps with respect to each other to mating engagement at said third rotational position.

* * * * *